(12) United States Patent
Park

(10) Patent No.: US 7,540,626 B2
(45) Date of Patent: Jun. 2, 2009

(54) BACKLIGHT UNIT OF LIQUID CRYSTAL DISPLAY

(75) Inventor: Dong Nyuck Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/808,570

(22) Filed: Jun. 11, 2007

(65) Prior Publication Data

US 2008/0055510 A1    Mar. 6, 2008

(30) Foreign Application Priority Data

Jun. 9, 2006    (KR)    ...................... 10-2006-0051972

(51) Int. Cl.
 *F21V 23/00* (2006.01)
(52) U.S. Cl. ...................... 362/221; 362/219
(58) Field of Classification Search .................. 362/219, 362/221
See application file for complete search history.

(56) References Cited

U.S. PATENT DOCUMENTS

2004/0027049 A1    2/2004    Lee

2004/0140773 A1    7/2004    Moon
2005/0157516 A1    7/2005    Chen

FOREIGN PATENT DOCUMENTS

JP    04-033202    2/1992
JP    2006-113513    4/2006

*Primary Examiner*—Laura Tso
(74) *Attorney, Agent, or Firm*—McKenna Long & Aldridge LLP

(57) ABSTRACT

A backlight unit of a liquid crystal display for arranging a wire for supplying a driving current connected to a common electrode to be penetrated a piece provided at the inside portion is disclosed.

In the backlight unit of the liquid crystal display, a cover bottom includes an accepting space to which the reflection sheet is attached. A first and a second side bottoms are arranged within the accepting space of the cover bottom, and are located to be symmetrical with both sides of the reflection sheet. A first and second common electrodes are commonly connected to both side ends of the plurality of lamps. A first piece is located between the lamps, and is formed to penetrate the first side bottom and the cover bottom. And wherein, a first wire for supplying a driving current connected to the first common electrode is arranged to penetrate the first common electrode.

8 Claims, 5 Drawing Sheets

BACKLIGHT UNIT OF LIQUID CRYSTAL DISPLAY

This application claims the benefit of Korean Patent Application No. P2006-051972 filed in Korea on Jun. 9, 2006, which is hereby incorporated by reference.

BACKGROUND OF THE INVENTION

1. Field of the Invention

The present invention relates to a backlight unit of a liquid crystal display, and more particularly to a backlight unit of a liquid crystal display that is adaptive for arranging a wire for supplying a driving current connected to a common electrode to be penetrated a piece provided at the inside portion.

2. Description of the Related Art

Generally, a liquid crystal display devices are widely used due to its characteristics of light weight, thin profile, low power consumption, etc. As a result, the liquid crystal display device is used in office automation equipment, audio/video equipment, etc. The liquid crystal display device controls the amount of light in accordance with a signal applied to a plurality of control switches that are arranged in a matrix, thereby displaying a desired picture on a screen.

In this way, the liquid crystal display device is not a self luminous display device, thus it requires a separate light source such as a backlight.

Backlights may be largely classified as a direct type and an edge type in accordance with the location of a light source. The edge type backlight has a light source installed at the edge of one side of a liquid crystal display device, and the edge type backlight irradiates light from the light source to a liquid crystal display panel through a light guide plate and a plurality of optical sheets. The direct type backlight has a plurality of light sources disposed directly under the liquid crystal display device, and the direct type backlight irradiates light from the light sources to the liquid crystal display panel through a diffusion plate and a plurality of optical sheets. Recently, the direct type backlight which has improved brightness, light uniformity and color purity versus the edge type backlight, is more often used in LCD TVs.

A cold cathode fluorescent lamp (hereinafter, referred to as "CCFL") and an external electrode fluorescent lamp (hereinafter, referred to as "EEFL") are used for a light source for a backlight.

Referring to FIG. 1, a related art EEFL is comprised of a glass tube 10, a phosphor 12 coated at an inner wall of the glass tube 10, inactive gasses 14 (or a discharge gas) injected into an internal of the glass tube 10, and an external electrode 16 installed at both external edges of the glass tube 10.

The glass tube 10 is a cylindrical type, and has an internal diameter of about 1.6 mm and an external diameter of about 2.0 mm. A length of the glass tube 10 is about 50 mm to 400 mm.

Ne and Ar are mixed in the inactive gasses 16 in a constant ratio, and a small quantity of Hg is mixed in the inactive gasses.

If an AC voltage from an inverter is applied to a high-level voltage electrode and a low-level voltage electrode, an electron is emitted from the low-level voltage electrode of the EEFL to collide with the inactive gasses of the internal of the glass tube, thus an amount of the electron is increased exponentially. As a result, the inactive gasses are excited by the electrons to emit the ultraviolet rays. The ultraviolet rays collides with the phosphor coated at the inner wall of the glass tube to emit a visible rays.

A backlight unit of a related art liquid crystal display device using the EEFL will be described as follows.

FIG. 2 is a perspective view showing a backlight unit of the related art liquid crystal display.

Referring to FIG. 2, a related art backlight unit 100 includes a plurality of lamps 110 arranged at a rear surface of a liquid crystal display panel, a reflection sheet 120 arranged at lower portion of the plurality of lamps 110, a cover bottom 130 to which the reflection sheet 120 is attached, and a first and second side bottoms 140 and 150 arranged at an internal of the cover bottom 130 and located to be symmetrical with both sides of the reflection sheet 120.

Herein, a first and second common electrodes 160 and 170 are formed at an internal of the backlight unit 100. The first common electrode 160 is formed to be adjacent to the first side bottom 140. The second common electrode 170 is formed to be adjacent to the second side bottom 150.

Furthermore, the first common electrode 160 is supplied with a driving current common voltage via a first wire 180 for supplying a driving current. In this case, the first wire 180 for supplying the driving current is connected to the first common electrode 160. The second common electrode 170 is supplied with a driving current common voltage via a second wire 190 for supplying a driving current. In this case, the second wire 190 for supplying the driving current is connected to the second common electrode 170. Herein, the first wire 180 is arranged to be exposed at an external of the first side bottom 140, and the second wire 190 is arranged to be exposed at an external of the second side bottom 150.

As described above, since the first and second wires are arranged to be exposed at the external, the lengths of the first and second wires for supplying the driving current are unnecessarily lengthened. As a result, in the related art backlight unit, a resistance disturbing a supply of the driving current is increased, and a volume of the product is getting bigger. Furthermore, inconvenience is caused by the first and second wires which are exposed at the external upon manufacturing of the related art backlight unit.

SUMMARY OF THE INVENTION

The present invention is to solve the above-mentioned problem. Accordingly, it is an object of the present invention to provide a backlight unit of a liquid crystal display that is adaptive for arranging a wire for supplying a driving current connected to a common electrode to be penetrated a piece provided at the inside portion.

It is another object of the present invention to provide a backlight unit of a liquid crystal display that is adaptive for arranging a wire for supplying a driving current connected to a common electrode to be penetrated a piece provided at the inside portion to shorten a length of a wire, thereby reducing a resistance which disturbs a supply of a driving current.

It is still another object of the present invention to provide a backlight unit of a liquid crystal display that is adaptive for arranging a wire for supplying a driving current connected to a common electrode to be penetrated a piece provided at the inside portion to reduce a volume compared to a product having a wire which is exposed at an external.

In order to achieve these and other objects of the invention, a backlight unit of a liquid crystal display according to the present invention, including a plurality of lamps irradiating a light to a liquid crystal display panel, and a reflection sheet reflecting a light irradiated from the lamps toward the liquid crystal display panel direction, comprises a cover bottom including an accepting space to which the reflection sheet is attached; a first and a second side bottoms arranged within the accepting space of the cover bottom, and located to be symmetrical with both sides of the reflection sheet; a first and second common electrodes commonly connected to both side ends of the plurality of lamps; a first piece located between the lamps, and formed to penetrate the first side bottom and the cover bottom; and wherein, a first wire for supplying a driving current connected to the first common electrode is arranged to penetrate the first common electrode.

A backlight unit of a liquid crystal display according to the present invention further comprises a second piece located between the lamps and formed to penetrate the second side bottom and the cover bottom, and wherein a second wire for supplying a driving current connected to the second common electrode is arranged to penetrate the second common electrode.

The first and second side bottoms are made of silicon.

The first and second pieces are made of a plastic.

The first and second pieces are formed at a location where is symmetrical to each other.

The first and second pieces are formed at a location where is not symmetrical to each other.

The diameters of the first and second pieces are the same each other.

The diameters of the first and second pieces are different from each other.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Hereinafter, the preferred embodiments of the present invention will be described in detail with reference to the accompanying drawings.

Figure 3:
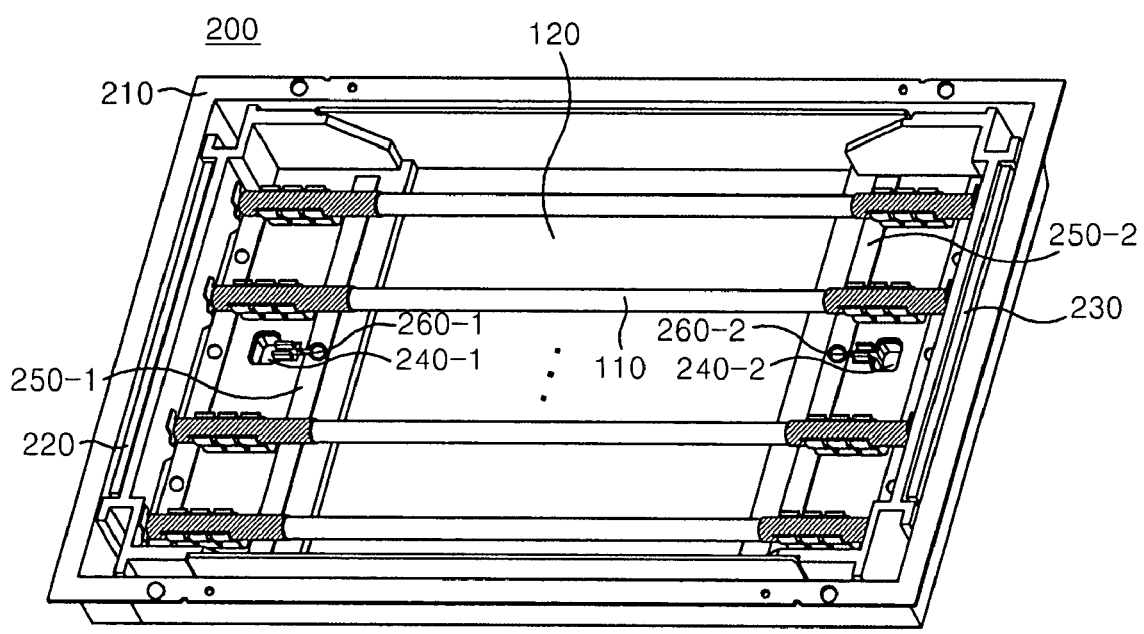
FIG. 3 is a perspective view showing a backlight unit of a liquid crystal display according to the present invention.

FIG. 3 is a perspective view showing a backlight unit of a liquid crystal display according to the present invention.

Figure 4:
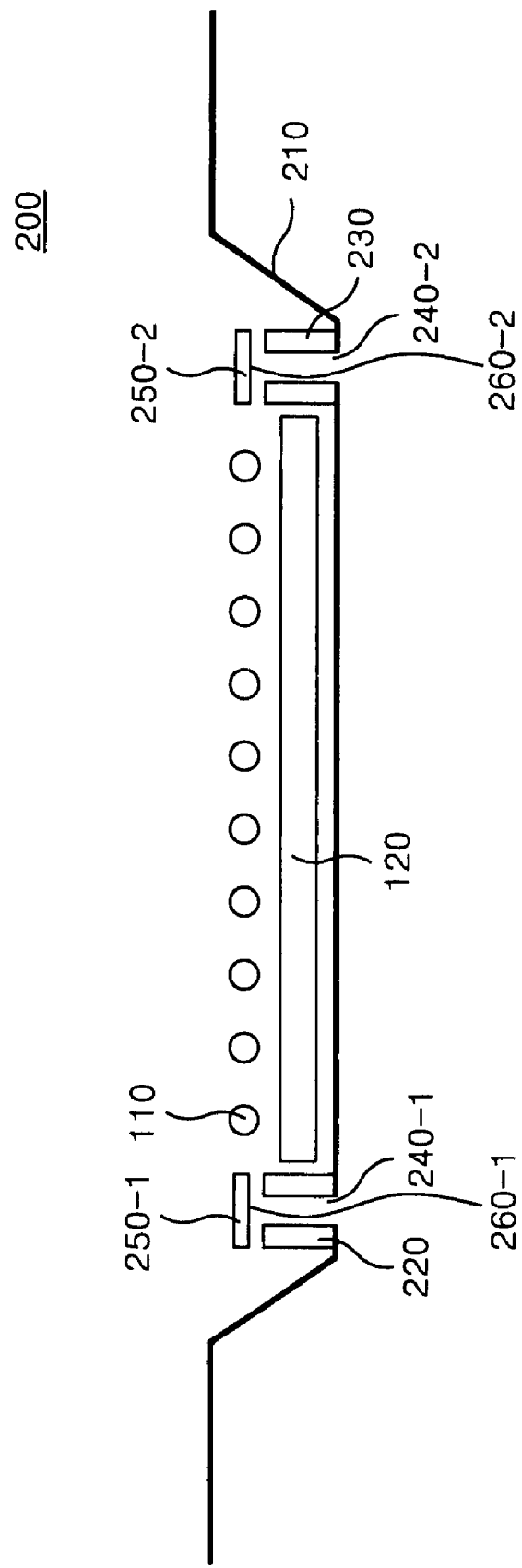
FIG. 4 is a sectional view showing the backlight unit of the liquid crystal display according to the present invention.

FIG. 4 is a sectional view showing the backlight unit of the liquid crystal display according to the present invention.

Figure 1:
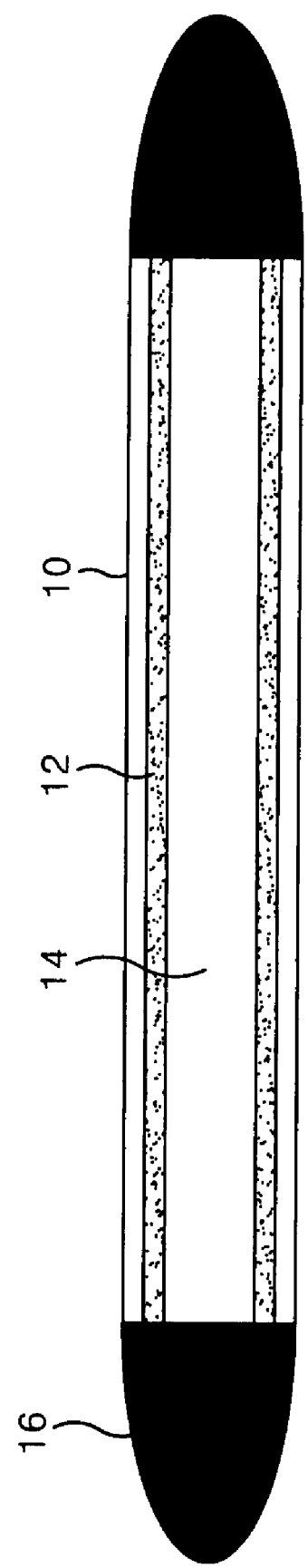
FIG. 1 is a diagram showing a related art lamp.
Figure 2:
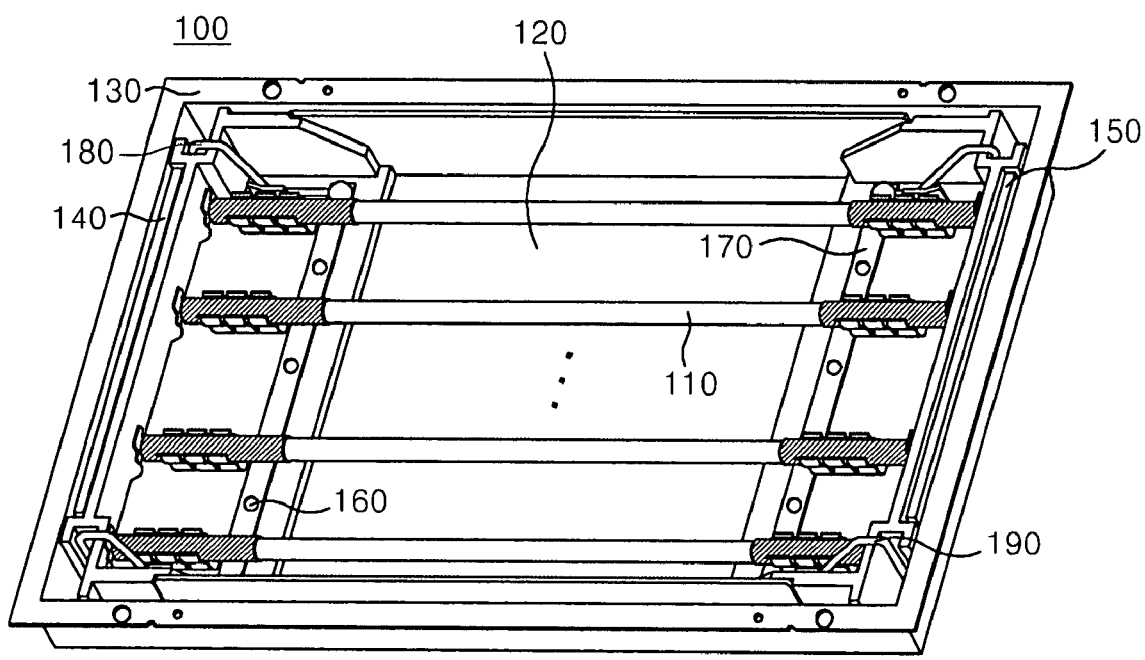
FIG. 2 is a perspective view showing a backlight unit of a related art liquid crystal display.

Referring to FIG. 3 and FIG. 4, a backlight unit 200 of the present invention includes a plurality of lamps 110 and a reflection sheet 120 arranged at lower portion the plurality of lamps 110 similar to the backlight unit 100 in FIG. 2.

Furthermore, the backlight unit 200 of the present invention includes a cover bottom 210 having the reflection sheet 120 which is attached to an accepting surface, a first and second side bottoms 220 and 230 arranged at an internal of the cover bottom 210 and located to be symmetrical with both sides of the reflection sheet 120, a first piece 240-1 formed to penetrate the first side bottom 220 and the cover bottom 210, and a second piece 240-2 formed to penetrate the second side bottom 230 and the cover bottom 210.

Furthermore, a first common electrode 250-1 and a second common electrode 250-2 are arranged at the backlight unit 200 of the present invention. In this case, the first common electrode 250-1 is commonly connected to the end of one side of the plurality of lamps 110. The second common electrode 250-2 is commonly connected to the end of the other side of the plurality of lamps 110. The end of one side of an inverter (not shown) and a first wire 260-1 are arranged via the first piece 240-1 at the backlight unit 200. In this case, the inverter (not shown) supplies a driving current of the lamps, and the first wire 260-1 is connected to the first common electrode 250-1. The end of the other side of the inverter and a second wire 260-2 are arranged via the second piece 240-2 at the backlight unit 200. Herein, the second wire 260-2 is connected to the second common electrode 250-2.

The plurality of lamps 110 is driven by a driving current supplied from the inverter to irradiate a light to the liquid crystal display panel. In this case, the driving current is applied to the first and second common electrodes 250-1 and 250-2 which are connected to the both side ends. Herein, the driving current from the inverter is supplied, via the first wire 260-1, to the first common electrode 250-1 and, at the same time is supplied, via the second wire 260-2, to the second common electrode 250-2.

The reflection sheet 120 is attached to the accepting surface of the cover bottom 210, and is specifically located between the first and second side bottoms 220 and 230. Such a reflection sheet 120 reflects a light which is irradiated toward a reverse direction of the liquid crystal display panel among the light irradiated from the lamps 110, toward a liquid crystal display panel direction.

The cover bottom 210 is formed of a metal material in a container type that one side surface is opened, and has an accepting space accepting the lamps 110, the reflection sheet 120, and the first and second side bottoms 220 and 230. The reflection sheet 120 is attached to the accepting surface of the cover bottom 210 by a double sided tape (not shown). The first and second side bottoms 220 and 230 are attached to both sides of the reflection sheet 120.

The first and second side bottoms 220 and 230 are located at both sides of the reflection sheet 120 to be attached to the cover bottom 210. One side of the lamps 110 is assembled at the first side bottom 220, and the other side of the lamps 110 is assembled at the second side bottom 230. Furthermore, the first common electrode 250-1 is attached to the first side bottom 220. In this case, the first common electrode 250-1 is commonly connected to an external electrode provided at one side of the lamps 110. The second common electrode 250-2 is attached to the second side bottom 230. In this case, the second common electrode 250-2 is commonly connected to an external electrode provided at the other side of the lamps 110. More specifically, in the present invention, the first and second side bottoms 220 and 230 are made of silicon.

The first piece 240-1 is a hole which penetrate the first side bottom 220 and the cover bottom 210. The first piece 240-1 is located between the lamps 110, and is located to be adjacent to the first common electrode 250-1.

The second piece 240-2 is a hole which penetrate the second side bottom 230 and the cover bottom 210. The second piece 240-2 is located between the lamps 110, and is located to be adjacent to the second common electrode 250-2. More specifically, the first and second pieces 240-1 and 240-2 are made of a plastic.

Figure 5:
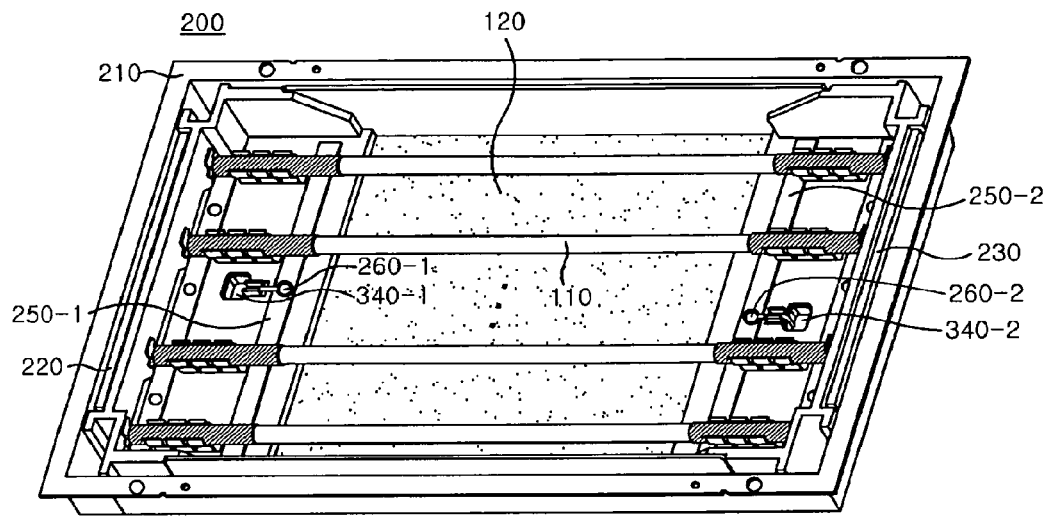
FIGS. 5 and 6 are perspective views showing a backlight unit of a liquid crystal display according to additional embodiments of the present invention.

The first and second pieces 240-1 and 240-2 are formed at a location where is symmetrical to each other. Referring to FIG. 5, the fist and second pieces 340-1 and 340-2 are formed at a location where is not symmetrical to each other.

Figure 6:
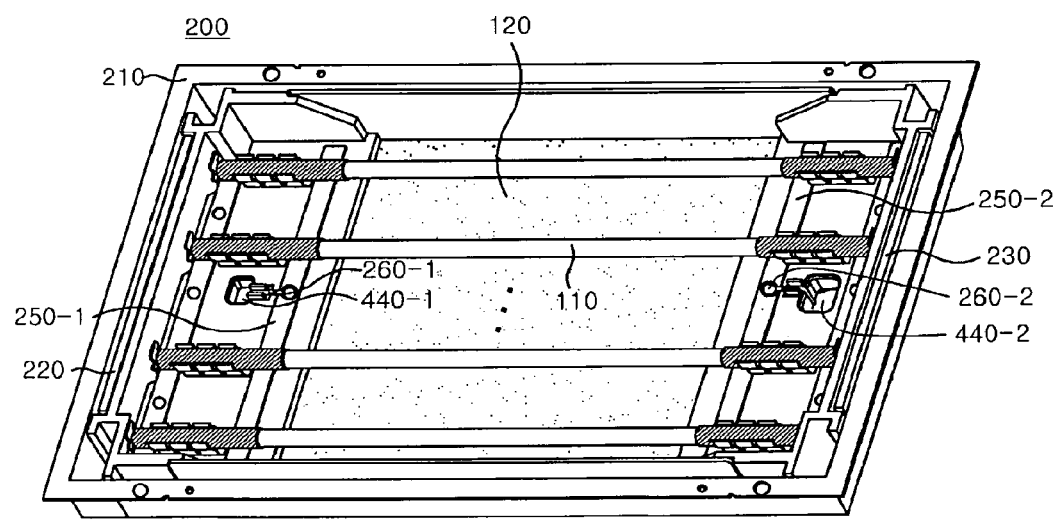

The diameters of the first and second pieces 240-1 and 240-2 are the same each other. Referring to FIG. 6, The diameters of the first and second pieces 440-1 and 440-2 are different from each other.

The first wire 260-1 is arranged to penetrate the first piece 240-1 to allow the end of the one side of the inverter and the first common electrode 250-1 to be electrically connected to each other.

The second wire 260-2 is arranged to penetrate the second piece 240-2 to allow the end of the other side of the inverter and the second common electrode 250-2 to be electrically connected to each other.

As described above, the present invention arranges a wire for supplying a driving current connected to a common electrode of a liquid crystal display to be penetrated a piece provided at the inside portion to shorten a length of a wire, thereby reducing a resistance which disturbs a supply of a driving current, and reducing a volume compared to a product having a wire which is exposed at an external. As a result, the present invention can get rid of any inconvenience caused by a wire upon manufacturing a product.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A backlight unit of a liquid crystal display, including a plurality of lamps irradiating a light to a liquid crystal display panel, and a reflection sheet reflecting a light irradiated from the lamps toward the liquid crystal display panel direction, comprising:

a cover bottom including an accepting space to which the reflection sheet is attached;

a first and a second side bottoms arranged side wall within the accepting space of the cover bottom, and located to be symmetrical with both sides of the reflection sheet;

a first and second common electrodes commonly connected to both side ends of the plurality of lamps;

a first piece located between the lamps, and formed to penetrate the first side bottom and the cover bottom; and wherein a first wire for supplying a driving current connected to the first common electrode is arranged to penetrate the first piece, wherein the first piece has a hole and is formed to penetrate toward a bottom of the cover bottom, and wherein the first piece is located to be adjacent to the first common electrode.

2. The backlight unit of the liquid crystal display as claimed in claim 1, further comprising:

a second piece located between the lamps and formed to penetrate the second side bottom and the cover bottom, wherein the second piece has a hole and is formed to penetrate toward a bottom of the cover bottom, wherein the second piece is located to be adjacent to the second common electrode, and wherein a second wire for supplying a driving current connected to the second common electrode is arranged to penetrate the second piece.

3. The backlight unit of the liquid crystal display as claimed in claim 1 or claim 2, wherein the first and second side bottoms are made of silicon.

4. The backlight unit of the liquid crystal display as claimed in claim 2, wherein the first and second pieces are made of a plastic.

5. The backlight unit of the liquid crystal display as claimed in claim 2, wherein the first and second pieces are formed at a location where is symmetrical to each other.

6. The backlight unit of the liquid crystal display as claimed in claim 2, wherein The first and second pieces are formed at a location where is not symmetrical to each other.

7. The backlight unit of the liquid crystal display as claimed in claim 2, wherein the diameters of the first and second pieces are the same each other.

8. The backlight unit of the liquid crystal display as claimed in claim 2, wherein the diameters of the first and second pieces are different from each other.

\* \* \* \* \*